(12) United States Patent  
Izumiura et al.

(10) Patent No.: US 6,651,436 B2
(45) Date of Patent: Nov. 25, 2003

(54) HYBRID VEHICLE CONTROL APPARATUS

(75) Inventors: Atsushi Izumiura, Utsunomiya (JP); Asao Ukai, Utsunomiya (JP); Shinichi Kitajima, Utsunomiya (JP); Futoshi Nishioka, Utsunomiya (JP); Fumihiko Konno, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 47 days.

(21) Appl. No.: 10/107,210

(22) Filed: Mar. 28, 2002

(65) Prior Publication Data

US 2002/0147070 A1 Oct. 10, 2002

(30) Foreign Application Priority Data

Apr. 4, 2001 (JP) ..................................... P2001-106383

(51) Int. Cl.[7] ................................................. F01B 21/04
(52) U.S. Cl. ............................. 60/708; 60/710; 60/711; 60/713; 60/719; 180/65.2
(58) Field of Search ........................... 60/698, 706, 708, 60/710, 711, 713, 719; 180/65.2

(56) References Cited

U.S. PATENT DOCUMENTS 6,220,019 B1    4/2001   Sugiura et al. ................ 60/285
6,316,842 B1   11/2001   Kuroda et al. ............. 290/40 C
6,334,079 B1   12/2001   Matsubara et al. ............ 701/22
6,352,489 B1    3/2002   Kuroda et al. ................. 477/5
6,380,641 B2    4/2002   Matsubara et al. ........ 290/40 C
6,382,335 B2    5/2002   Takashima et al. ........ 180/65.2

FOREIGN PATENT DOCUMENTS

JP              7-123509         5/1995

*Primary Examiner*—Hoang Nguyen
(74) *Attorney, Agent, or Firm*—Armstrong, Westerman & Hattori, LLP

(57) ABSTRACT

A control apparatus for a hybrid vehicle of the present invention determines whether a brake switch flag F_BKSW is "1" or not (step S101), and in the case where the brake is on ("yes"), obtains a deceleration regeneration computation value DECRGN by table retrieval from a #REGENBR table. In the case where the brake is off ("no"), it is determined whether a fuel supply cut delay time regeneration flag F_RGNFCD is "1" or not (step S104). In the case where regeneration is not performed in the fuel supply cut delay time ("no"), a deceleration regeneration computation value DECRGN is obtained by table retrieval from a #REGEN table (step S105). On the other hand, in the case where regeneration is performed in the fuel supply cut delay time ("yes"), a deceleration regeneration computation value DECRGN is obtained by table retrieval from a #RGNNFCD table (step S106).

6 Claims, 8 Drawing Sheets

HYBRID VEHICLE CONTROL APPARATUS

BACKGROUND OF THE INVENTION

1. Field of the Invention

The present invention relates to a control apparatus for a hybrid vehicle which is driven by an engine and a motor. In particular, the invention relates to technology in energy recovery control, for making a recovery amount by a motor at the time of deceleration of a vehicle appropriately correspond to vehicle operating conditions.

2. Description of the Related Art

Heretofore there is known a hybrid vehicle incorporating a motor in addition to an engine as drive sources for vehicle propulsion.

One type of such a hybrid vehicle is a parallel hybrid vehicle which uses the motor as an assistance drive source for assisting the output from the engine. In this parallel hybrid vehicle, for example at the time of acceleration, the engine is assisted by means of the motor, while at the time of deceleration, various control is carried out such as performing battery charging by deceleration regeneration, so that the electrical energy (hereunder remaining charge) of the battery can be maintained and the requirements of the driver can be met. For example as shown in Japanese Unexamined Patent Application, First Publication No. 7-123509.

In the abovementioned control apparatus for a hybrid vehicle according to one example of the conventional technology, there is known a control which suppresses fuel consumption by stopping fuel supply to the engine, and which improves energy recovery by converting a part of the kinetic energy of the vehicle by regenerative braking by means of the motor into electrical energy, and storing this.

In this case, the control for stopping and reopening the fuel supply to the engine, is executed based on the operating conditions of the vehicle (for example the degree of throttle opening related to the amount of accelerator operation by the driver). However, in a period from the point in time where the operating conditions of the vehicle (for example the degree of throttle opening being fully closed) are such as to determine stopping fuel supply, until the fuel supply is actually stopped, consideration is not given as to whether or not regenerative braking by the motor is being performed. Hence, in this period, there is the possibility of kinetic energy of the vehicle being wastefully consumed. As a result, in operating conditions such as while travelling in a city area where there is frequent changing between acceleration and deceleration, there is the possibility of the remaining charge of the battery (electrical energy) becoming lower than a predetermined tolerance.

SUMMARY OF THE INVENTION

The present invention takes into consideration the abovementioned situation with the object of providing a control apparatus for a hybrid vehicle which can improve energy recovery in accordance with operating conditions at the time of vehicle deceleration.

A control apparatus for a hybrid vehicle of the present invention incorporates an engine and a motor as the vehicle drive sources, and a storage unit which converts a part of an output of the engine or kinetic energy of the vehicle into electrical energy by the motor, and stores this. The control apparatus comprises an operating condition detection device which detects an operating condition of the vehicle; a deceleration condition detection device which detects a deceleration condition at a time of deceleration of the vehicle; a fuel supply amount control device which at a time of deceleration of the vehicle detected by the deceleration condition detection device, executes stopping and supply of fuel to the engine corresponding to operating condition of the vehicle; an electric power generation amount control device which at a time of deceleration of the vehicle detected by the deceleration condition detection device, in the case where regenerative braking is performed to convert a part of the kinetic energy of the vehicle into electrical energy by the motor, sets the electric power generation amount which should be recovered by the motor to generate electric power, based on the operating conditions of the vehicle detected by the operating conditions detection device; and a motor control device which performs regenerative braking in accordance with the electric power generation amount set by the electric power generation amount setting device. The electric power generation amount control device has an electric power generation amount setting device which sets in the fuel supply amount control device, a first electric power generation amount for a vehicle operating condition in a deceleration condition of the vehicle at a time of moving from a condition of executing fuel supplying to the engine to condition of stopping fuel supply, and sets in the fuel supply amount control device, a second electric power generation amount for a vehicle operating condition in a deceleration condition of the vehicle at a time of executing stopping of fuel supply to the engine.

According to the abovedescribed control apparatus for a hybrid vehicle, at the time of deceleration of the vehicle detected by a deceleration condition detection device, regenerative braking is performed by the motor in accordance with an electric power generation amount set by an electric power generation amount setting device of an electric power generation amount control device.

That is to say, in a deceleration condition, in a fuel supply amount control device, regenerative braking is executed to satisfy a first electric power generation amount, with respect to a first predetermined operating condition for at the time of moving from a condition of executing fuel supply to an engine, to a stopped condition, and in a deceleration condition, in the fuel supply amount control device, regenerative braking is executed to satisfy a second electric power generation amount, with respect to a second predetermined operating condition for when fuel supply to the engine is stopped.

As a result, at the time of deceleration of the vehicle, regenerative braking by the motor is also performed in the period from a point in time where it is determined to stop fuel supply based on operating conditions of the vehicle such as for example, a degree of throttle opening, an on or off condition of a brake, an engine revolution speed or the like, until the fuel supply is actually stopped. Hence energy recovery can be improved. As a result, it is possible to prevent the remaining charge of the battery from becoming excessively low.

Moreover, for the regeneration amount in this regenerative braking, two different electric power generation amounts (that is, the first and second electric power generation amounts) are set corresponding to the operating conditions at the time of deceleration. Hence the deceleration feeling of the vehicle can be made to appropriately follow the intention of the driver (for example the action of depressing the accelerator pedal), so that drivability can be improved.

The electric power generation amount setting device may set the first electric power generation amount to a larger value than the second electric power generation amount.

In this case, for example at the time of deceleration of the vehicle with the brake off, the regenerative braking is executed to satisfy the first electric power generation amount when the degree of throttle opening is less than a predetermined opening, and the regenerative braking is executed to satisfy the second electric power generation amount when the degree of throttle opening is greater than the predetermined opening, the first electric power generation amount is set to a larger value than the second electric power generation amount.

As a result, regenerative braking can be appropriately performed corresponding to the operating conditions of the vehicle, and energy recovery and drivability can be improved.

The electric power generation amount setting device may set a difference between the first electric power generation amount and the second electric power generation amount so as to increase with a reduction in speed of the vehicle within a predetermined range of the speed.

In this case, by setting for a vehicle speed within a predetermined range, so that the first electric power generation amount is larger than the second electric power generation amount on low vehicle speed side, energy recovery can be even further improved. Moreover, since the effect of the regenerative braking on the deceleration feeling which the driver feels has a greater influence more on the low speed side, the deceleration feeling can be made to even more appropriately follow the intention of the driver, so that drivability can be improved.

The electric power generation amount setting device may correct the first electric power generation amount and the second electric power generation amount in accordance with an operation of a control device which controls the vehicle and an operation of various auxiliary equipment and the like which are driven by the engine.

According to this control apparatus for a hybrid vehicle, the first electric power generation amount and the second electric power generation amount are corrected in accordance with an on or off condition of a control device comprising for example a brake, or for example the on or off condition of various auxiliary equipment such as a compressor of an air-conditioner constituting an air-conditioning system driven by the engine. As a result, appropriate regenerative braking can be performed corresponding to the operating conditions of the vehicle.

The electric power generation amount setting device, in a deceleration condition of the vehicle while moving from a condition of executing fuel supplying to the engine to condition of stopping fuel supply, in a case where the control device is not operated and an accelerator is not depressed, may set so that the regeneration electric power generation amount by the motor becomes the first electric power generation amount.

In this case, by performing appropriate regenerative braking by the motor, also in the period from a point in time where it is determined to stop fuel supply until the fuel supply is actually stopped, energy recovery can be improved.

The electric power generation amount setting device, in a deceleration condition of the vehicle while moving from a condition of executing fuel supplying to the engine to condition of stopping fuel supply, in a case where the control device is operated and the accelerator is not depressed, may set so that the regeneration electric power generation amount by the motor becomes the second electric power generation amount.

DETAILED DESCRIPTION OF THE INVENTION

Hereunder is a description of an embodiment of a hybrid vehicle control apparatus of the present invention with reference to the drawings.

Figure 1:
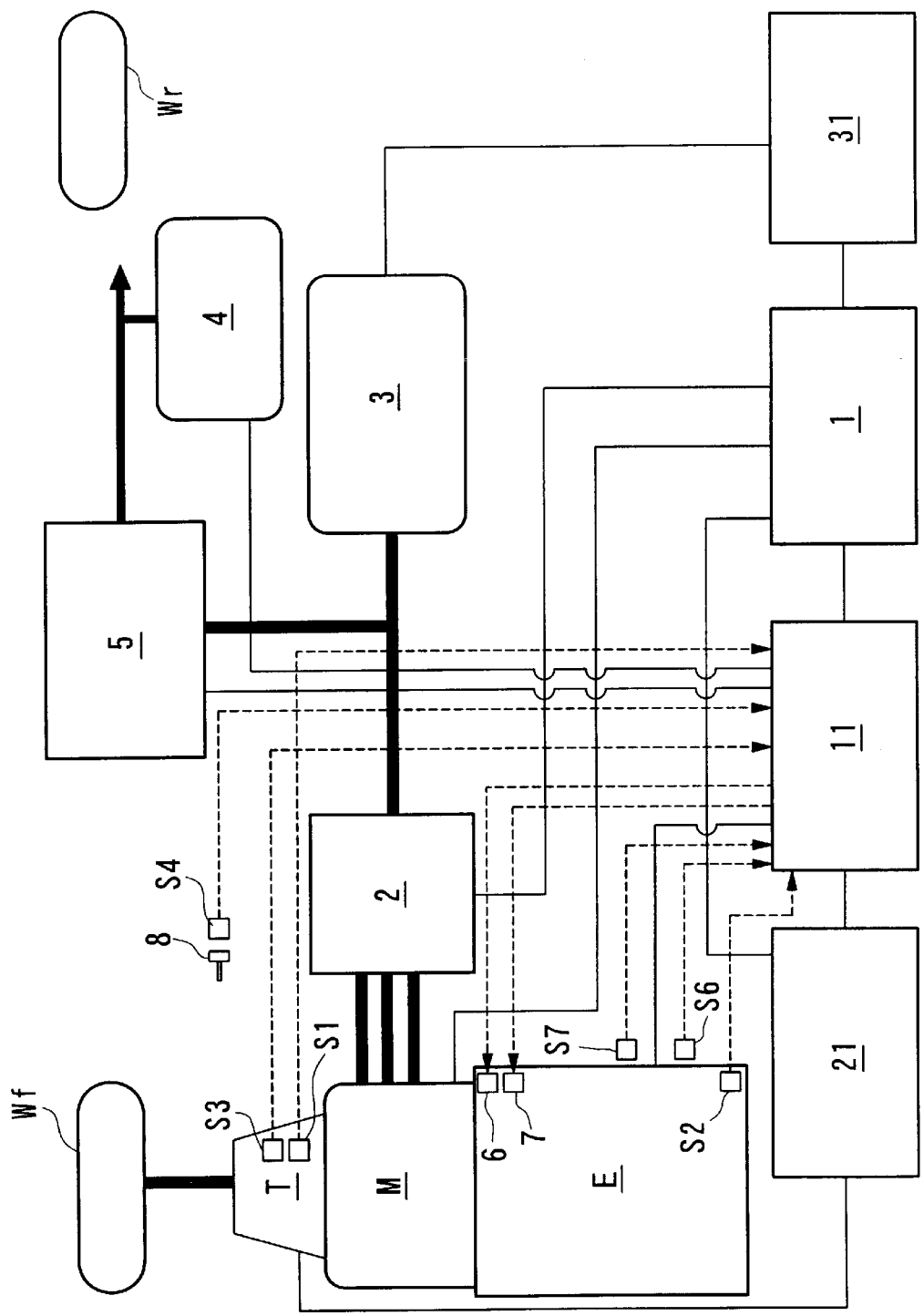
FIG. 1 is a block diagram of a hybrid vehicle furnished with a control apparatus for a hybrid vehicle according to an embodiment of the present invention.

FIG. 1 shows a parallel hybrid vehicle of an embodiment of the present invention, in which an engine E, a motor M and a transmission T are connected in series. The driving forces from both the engine E and the motor M are transmitted to front wheels Wf serving as drive wheels via an automatic transmission (CVT) T. Furthermore, when a driving force is transmitted to the motor M side from the front wheels Wf at the time of deceleration of the hybrid vehicle, the motor M functions as a generator to produce so called regenerative braking, and the kinetic energy of the vehicle is recovered as electrical energy. The rear wheels are designated as Wr.

The drive and regenerative braking of the motor M are controlled by a power drive unit 2, which receives control instructions from a motor ECU 1. A battery 3 of a high voltage system for transferring electrical energy to and from the motor M is connected to the power drive unit 2. The battery 3 is constructed from individual modules wherein, for example, a plurality of cells is connected in series, with a plurality of these modules connected in series. Mounted on the hybrid vehicle is a 12 volt auxiliary battery 4 for driving various auxiliary equipment. This auxiliary battery 4 is connected to the battery 3 via a downverter 5. The downverter 5, which is controlled by a FIECU 11, reduces the voltage of the battery 3 to charge the auxiliary battery 4.

The FIECU 11, in addition to the motor ECU 1 and the downverter 5, controls the operation of a fuel supply amount control device 6 for controlling the amount of fuel supplied to the engine E, the operation of a starter motor 7, and also the ignition timing. Therefore, inputs to the FIECU 11 are: a signal from a vehicle speed sensor S1 which detects the vehicle speed V based on the revolution speed of a drive shaft of the transmission, a signal from an engine revolution speed sensor S2 which detects engine revolution speed NE, a signal from a gear shift position sensor S3 which detects the shift position of the transmission T, a signal from a brake switch S4 which detects the operation of a brake pedal 8, a signal from a throttle opening sensor S6 which detects the degree of throttle opening TH, and a signal from an air intake passage pressure sensor S7 which detects air intake passage pressure PB. Numeral 21 denotes a CVTECU for the CVT control, and numeral 31 denotes a battery ECU that protects the battery 3, and computes the remaining charge SOC of the battery 3.

Zoning of Remaining Battery Charge SOC

Next is a description of the before-mentioned remaining battery charge SOC zoning (so called zone separation of remaining charge). Computation of the remaining battery charge is performed in the battery ECU 31, being computed for example using voltage, discharge current, temperature and the like.

In this example, with zone A (from SOC 40% to SOC 80% to 90%) being a normal use zone as the basis, this is divided into zone B (from SOC 20% to SOC 40%) below this being a temporary use zone, and zone C (from SOC 0% to SOC 20%) further below being an over-discharge zone. Above zone A there is provided zone D (from SOC 80% to 90% to 100%) being an overcharge zone.

A mode for energy management corresponding to zone A being the principal normal use zone, constitutes a discharge and charge permit mode for permitting at least discharge and charge, and a mode for energy management corresponding to zone C being the over-discharge zone is configured as a discharge suppression mode for permitting charge and suppressing discharge. Furthermore, the battery ECU 31 constitutes a charge condition detection device.

MA (Motor) Basic Modes

Figure 2:
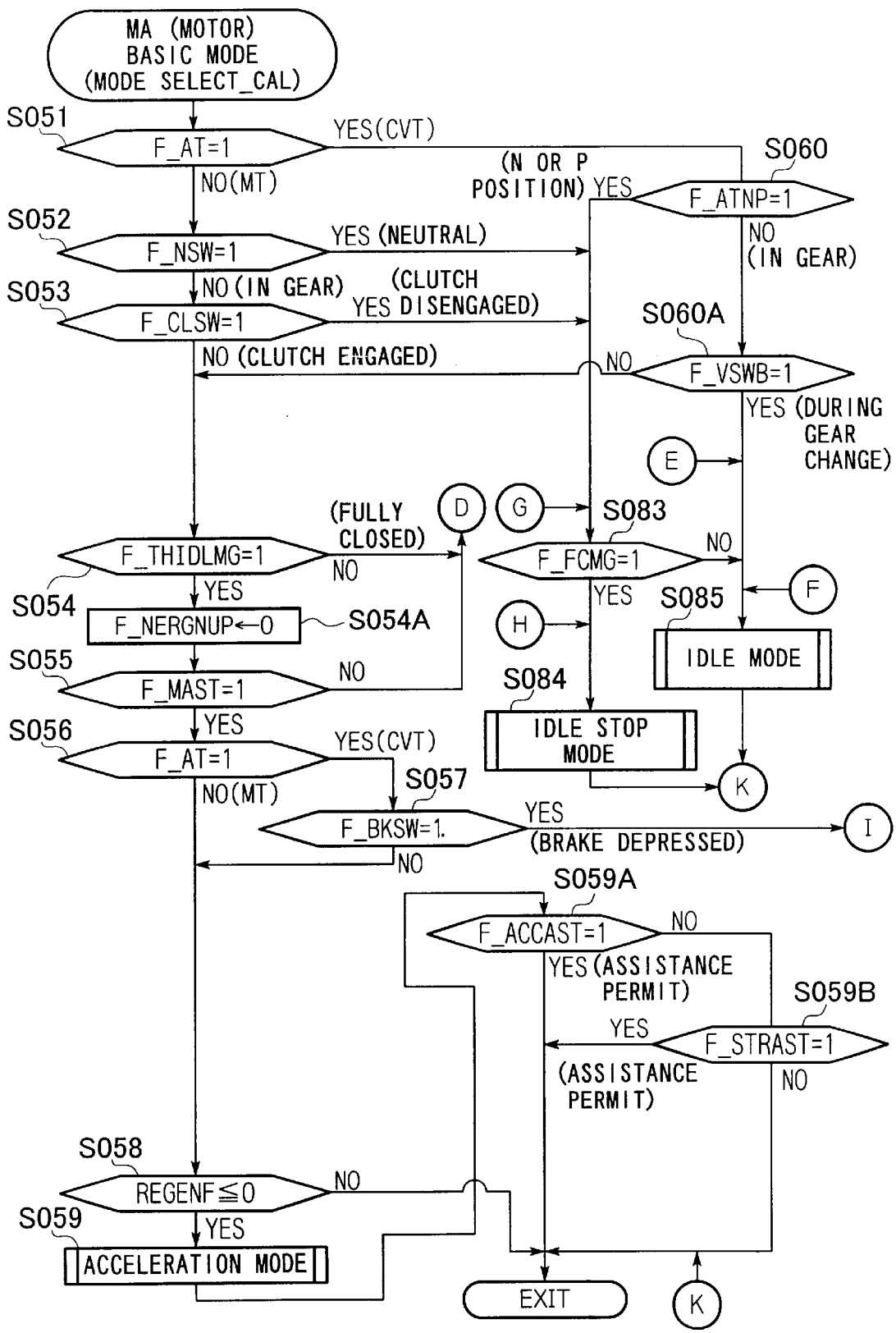
FIG. 2 is a flow chart showing a motor operating mode determination.
Figure 3:
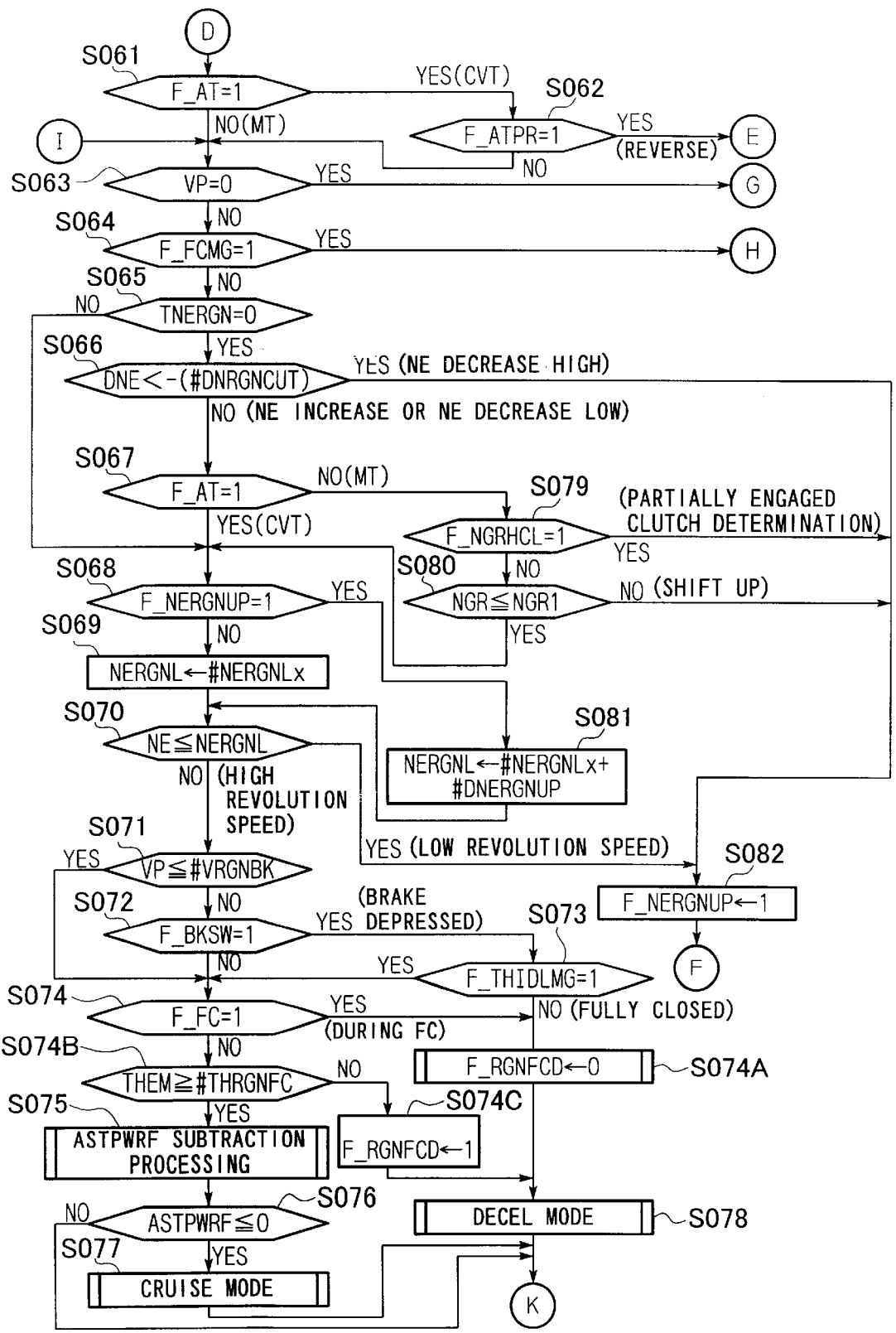
FIG. 3 is a flow chart showing the motor operating mode determination.

Next is a description of the MA (motor) basic modes which determine in which mode the motor M will be operated, based on the flow charts shown in FIG. 2 and FIG. 3.

This processing is repeated at a predetermined cycle time.

The MA (motor) basic modes are: "idle mode", "idle stop mode", "deceleration mode", "cruise mode" and "acceleration mode". In the idle mode, fuel supply is resumed after fuel supply cut to maintain the engine E in an idle condition, and in the idle stop mode, for example at the time the vehicle is stopped, the engine is stopped in a defined condition. Furthermore, in the deceleration mode, regenerative braking by the motor M is performed. In the acceleration mode, the engine E is drive assisted by the motor M, and in the cruise mode, the motor M is not driven so that the vehicle runs under the driving force of the engine E.

The hybrid vehicle in this embodiment is a CVT vehicle, however from the reason of specification, the respective flow charts shown hereunder can also be used jointly for the case of a manual transmission (MT) vehicle.

In step S051 of FIG. 2, it is determined whether an MT/CVT determination flag F_AT is "1" or not. In the case where the determination is "yes" (a CVT vehicle), the flow proceeds to step S060. In the case where the determination is "no" (an MT vehicle), the flow proceeds to step S052.

In step S060, it is determined whether a CVT in gear determination flag F_ATNP is "1" or not. In the case where the determination is "yes" (N or P position), the flow proceeds to step S083, and in the case where the determination is "no" (in gear), the flow proceeds to step S060A.

In step S060A, it is determined whether the gear shift is being operated (shift position cannot be determined due to the gear shift being operated) by whether a gear shifted flag F_VSWB is "1" or not. In the case where the determination is "yes" (being shifted), the flow proceeds to step S085, shifts to "idle mode", and control terminates. In idle mode, the engine E is maintained in an idle state. In the case where the determination of step S060A is "no" (not being shifted), the flow proceeds to step S054.

In step S083, it is determined whether an engine stop control execution flag F_FCMG is "1" or not. In the case where the determination of step S083 is "no", the flow shifts to "idle mode" in step S085, and control terminates. In the case where the determination of step S083 is "yes", the flow proceeds to step S084, shifts to "idle stop mode", and control terminates. In the idle stop mode, for example at the time the vehicle is stopped, the engine is stopped in a defined condition.

In step S052, it is determined whether a neutral position determination flag F_NSW is "1" or not. In the case where the determination is "yes" (neutral position), the flow proceeds to step S083, and in the case where the determination is "no" (in gear), the flow proceeds to step S053.

In step S053, it is determined whether a clutch engaged determination flag F_CLSW is "1" or not. In the case where the determination is "yes" (clutch is disengaged), the flow proceeds to step S083, and in the case where the determination is "no" (clutch is engaged), the flow proceeds to step S054.

In step S054, it is determined whether an idle determination flag F_THIDLMG is "1" or not. In the case where the determination is "no" (fully closed), the flow proceeds to step S061, and in the case where the determination is "yes" (not fully closed), the flow proceeds to step S054A.

In step S054A, an engine revolution speed increase flag F_NERGNUP for at the time of partially engaged clutch determination is set to "0", and the flow proceeds to step S055.

In step S055, it is determined whether a motor assistance determination flag F_MAST is "1" or not. This flag determines whether or not the engine is to be assisted by the motor M. In the case of "1", it means that assistance is required, and in the case of "0", assistance is not required. This motor assistance determination flag is set by assistance trigger determination processing.

In the case where the determination of step S055 is "no", the flow proceeds to step S061. In the case where the determination of step S055 is "yes", the flow proceeds to step S056.

In step S056, it is determined whether a MT/CVT determination flag F_AT is "1" or not. In the case where the determination is "yes" (a CVT vehicle), the flow proceeds to step S057, and in the case where the determination is "no" (an MT vehicle), the flow proceeds to step S058.

In step S057, it is determined whether a brake on determination flag F_BKSW is "1" or not. In the case where the determination is "yes" (brake on), the flow proceeds to step S063, and in the case where the determination is "no" (brake off), the flow proceeds to step S058.

In step S058, it is determined whether or not a final charge instruction value REGENF is less than or equal to "0". In the case where the determination is "yes", the flow proceeds to "acceleration mode" in step S059. In acceleration mode, the engine E is drive assisted by the motor M, and the flow proceeds to step S059A. In the case where the determination of step S058 is "no", control terminates.

In step S059A, it is determined whether an assistance permission flag F_ACCAST is "1" or not. In the case where the determination is "yes", control terminates, and in the case where the determination is "no", the flow proceeds to step S059B.

In step S059B, it is determined whether a departure assistance permission flag F_STRAST is "1" or not. In the case where the determination is "yes", and in the case where the determination is "no", control terminates.

In step S061, it is determined whether the MT/CVT determination flag F_AT is "1" or not. In the case where the determination is "no" (an MT vehicle), the flow proceeds to step S063, and in the case where the determination is "yes" (a CVT vehicle), the flow proceeds to step S062.

In step S062, it is determined whether a reverse position determination flag F_ATPR is "1" or not. In the case where the determination is "yes" (reverse position), the flow proceeds to step S085, and in the case where the determination is "no" (position other than reverse), the flow proceeds to step S063.

In step S063, it is determined whether a vehicle speed VP is "0" or not. In the case where the determination is "yes", the flow proceeds to step S083, and in the case where the determination is "no", the flow proceeds to step S064.

In step S064, it is determined whether the engine stop control execution flag F_FCMG is "1" or not. In the case where the determination is "no", the flow proceeds to step S065, and in the case where the determination is "yes", the flow proceeds to step S084.

In step S065, it is determined whether a forced gear change REGEN cancellation determination processing delay timer TNERGN is "0" or not. In the case where the determination is "yes", the flow proceeds to step S066, and in the case where the determination is "no", the flow proceeds to step S068.

In step S066, it is determined whether or not the rate of change of engine revolution speed DNE is less than the negative value of a DNE REGEN cut determination engine revolution speed #DNRGNCUT. Here, the DNE REGEN cut determination engine revolution speed #DNRGNCUT is the rate of change DNE of engine revolution speed NE which becomes a reference for determining whether or not the generation amount is to be subtracted, depending on the rate of change of engine revolution speed DNE.

In the case where the determination of step S066 is that the decrease (rate of fall) of the engine revolution speed NE is high (yes), the flow proceeds to step S082. In step S082, the engine revolution speed increase flag F_NERGNUP for at the time of partially engaged clutch determination is set to "1", and the flow proceeds to step S085.

In the case where the determination of step S066 is that the engine revolution speed NE is increasing (up), or the decrease (rate of fall) of the engine revolution speed NE is low (no), the flow proceeds to step S067.

In step S067, it is determined whether the MT/CVT flag F_AT is "1" or not. In the case where the determination is "no" (an MT vehicle), the flow proceeds to step S079, and in the case where the determination is "yes" (a CVT vehicle), the flow proceeds to step S068.

In step S079, it is determined whether a partially engaged clutch determination flag F_NGRHCL is "1" or not. In the case where the determination is that the clutch is determined to be partially engaged (yes), the flow proceeds to step S082. Furthermore, in the case where the clutch is determined to not be partially engaged (no), the flow proceeds to step S080.

In step S080, the previous gear position NGR and the present gear position NGR1 are compared, and it is determined whether or not there has been a shift up by comparison between the present and previous gear positions.

In the case where the determination of step S080 is that the gear position has been shifted up (no), the flow proceeds to step S082. In the case where the determination of step S080 is that the gear position has not been shifted up between the previous and present times (yes), the flow proceeds to step S068.

In step S068, it is determined whether the engine revolution speed increase flag F_NERGNUP for at the time of partially engaged clutch determination is "1" or not. In the case where the determination is that an increase in engine revolution speed is required at the time of partially engaged clutch determination and the flag is set (=1, yes), the flow proceeds to step S081, a revolution speed increase #DNERGNUP for preventing hunting is added to the charge engine revolution speed lower limit value #NERGNLx, which is set for each gear, this added value is set to the charge engine revolution speed lower limit value NERGNL, and the flow proceeds to step S070.

In the case where the determination of step S068 is that an increase in engine revolution speed is not required at the time of partially engaged clutch determination, and the flag is reset (=0, no), the flow proceeds to step S069, the charge engine revolution speed lower limit value #NERGNLx, which is set for each gear, is set to the charge engine revolution speed lower limit value NERGNL, and the flow proceeds to step S070.

Then, in step S070 it is determined whether or not the engine revolution speed NE is less than or equal to the charge engine revolution speed lower limit value NERGNL. In the case where the determination is that it is revolving slowly (NE≦NERGNL, yes), the flow proceeds to step S082. In the case where the determination is that it is revolving quickly (NE>NERGNL, no), the flow proceeds to step S071.

In step S071, it is determined whether or not the vehicle speed VP is less than or equal to a deceleration mode brake determination lower vehicle speed limit #VRGNBK. This deceleration mode brake determination lower vehicle speed limit #VRGNBK is a value having hysteresis. In the case where the determination is that the vehicle speed VP≦the deceleration mode brake determination lower vehicle speed limit #VRGNBK (yes), the flow proceeds to step S074. In the case where the determination in step S071 is that the vehicle speed VP>the deceleration mode brake determination lower vehicle speed limit #VRGNBK (no), the flow proceeds to step S072.

In step S072, it is determined whether a brake on determination flag F_BKSW is "1" or not. In the case where the determination is "yes", the flow proceeds to step S073, and in the case where the determination is "no", the flow proceeds to step S074.

In step S073, it is determined whether the idle determination flag F_THIDLMG is "1" or not. In the case where the determination is "no" (throttle is fully closed), then in step S074A, a fuel supply cut delay time regeneration flag F_RGNFCD is set to "0", the flow proceeds to "deceleration mode" in step S078 and control terminates. Fuel supply cut delay time regeneration means regeneration processing for applying an appropriate deceleration feeling during a period before entering fuel supply cut. In the case where this processing is performed, the fuel supply cut delay time regeneration flag F_RGNFCD is "1", while in the case where this processing is not performed, this is "0". In "deceleration mode", regenerative braking is performed by the motor M.

In step S074, it is determined whether a fuel supply cut flag F_FC is "1" or not. This flag is a fuel supply cut determination flag which becomes "1" when regeneration by the motor M is performed in "deceleration mode" in step S078, to cut off the fuel. If the determination in step S074 is that deceleration fuel supply cut is in effect (yes), the flow proceeds to step S074A. If the determination in step S074 is that fuel supply cut is not in effect (no), the flow proceeds to step S074B.

In step S074B, it is determined whether or not a current value THEM for the degree of throttle opening TH is greater than or equal to a predetermined deceleration mode throttle determination value #THRGNFC for at a time other than with fuel supply cut. In the case where the determination is "yes", the flow proceeds to step S075, and in the case where the determination is "no", the flow proceeds to step 8074. The deceleration mode throttle determination value #THRGNFC for at a time other than with fuel supply cut, is a value having hysteresis.

In step S074C, the fuel supply cut delay regeneration flag F_RGNFCD is set to "1" and the flow proceeds to step S078.

In step S075 subtraction processing of a final assistance command value ASTPWRF is performed, and the flow proceeds to step S076.

In step S076, it is determined whether or not the final assistance command value ASTPWRF is less than or equal to "0". In the case where the determination is "yes", the flow shifts to "cruise mode" in step S077, and control terminates. In cruise mode the motor M is not driven and the vehicle runs under the driving force of the engine E. Furthermore, the battery 3 may be charged by regenerative operation of the motor M or by using the motor as a generator depending on the running conditions of the vehicle.

In the case where the determination of step S076 is "no", control terminates.

Deceleration Mode

The deceleration mode will now be described, based on FIG. 4 and FIG. 5.

Figure 4:
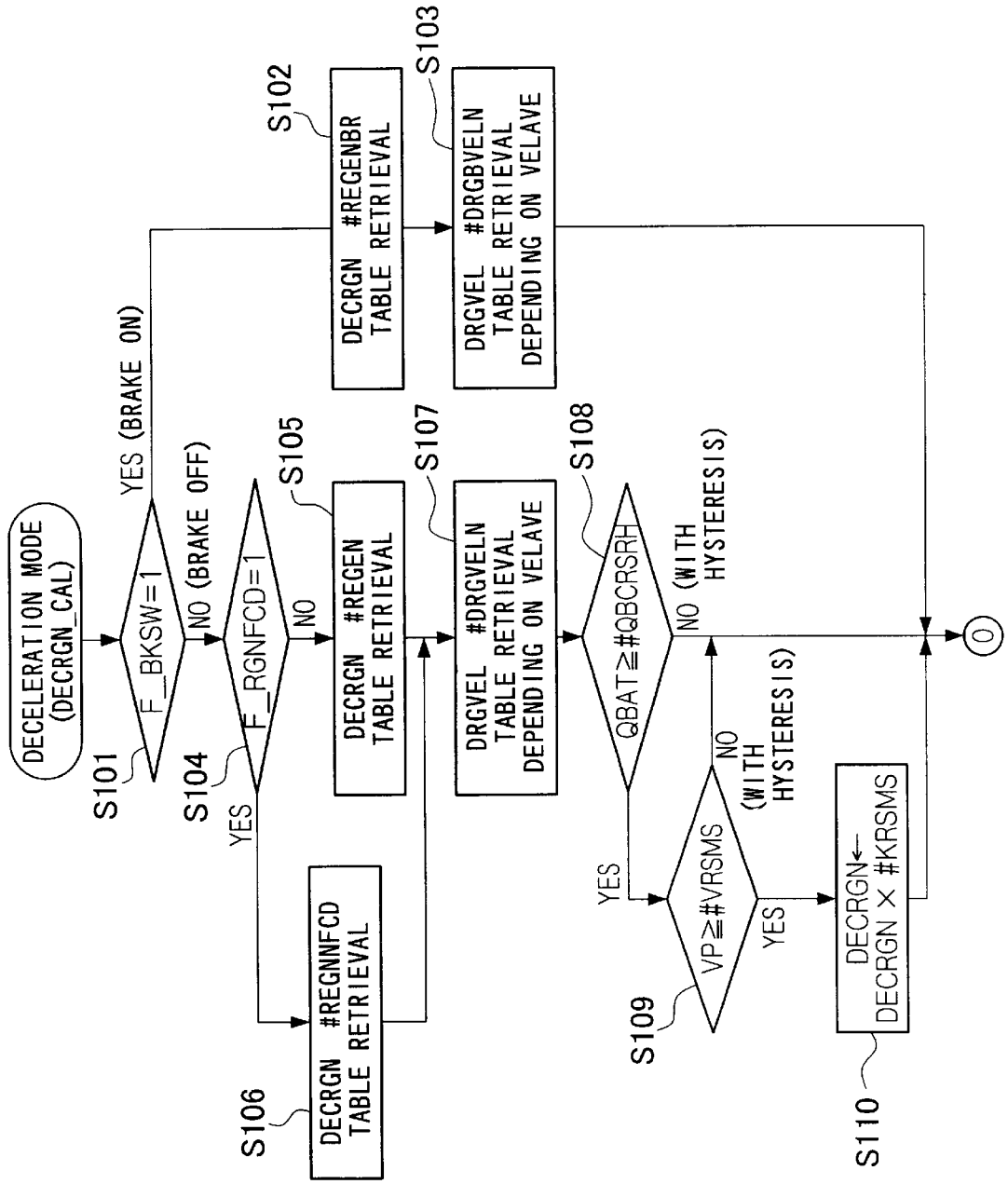
FIG. 4 is a flow chart of a deceleration mode shown in FIG. 3.

At first, in step S101 shown in FIG. 4, it is determined whether a brake switch flag F_BKSW is "1" or not.

In the case where the determination is "no", that is in the case where the brake switch is off, the flow proceeds to a later described step S104. On the other hand, in the case where the determination is "yes", that is in the case where the brake is on, the flow proceeds to step S102.

In step S102, a deceleration regeneration computation value DECRGN is obtained by table retrieval from a #REGENBR table which differs depending on whether for MT or CVT, and depending on an on or off switching of various auxiliary equipment such as a compressor of an air conditioner constituting an air-conditioning system driven by the engine E.

In step S103, a deceleration regeneration correction amount DRGVEL which changes with a tendency to increase accompanying an increase of a mean consumption current VELAVE, is obtained by table retrieval from a #DRGBVELN table. The flow then proceeds to a later described step S111. The mean consumption current VELAVE is used when the regeneration amount is increased accompanying an increase in the consumption current of the auxiliary battery 4.

In step S104, it is determined whether or not the fuel supply cut delay time regeneration flag F_RGNFCD is "1" or not.

In the case where the determination is "no", that is in the case where regeneration is not performed in the fuel supply cut delay time, the flow proceeds to step S105, and a deceleration regeneration computation value DECRGN is obtained by table retrieval from a #REGEN table which changes with a tendency to increase accompanying an increase in vehicle speed VAST, and which differs depending on whether for MT or CVT, and depending on an on or off switching of various auxiliary equipment such as a compressor of an air conditioner constituting an air-conditioning system driven by the engine E. The flow then proceeds to a later described step S107.

On the other hand, in the case where the determination is "yes", that is in the case where regeneration is performed in the fuel supply cut delay time, the flow proceeds to step S106, and the deceleration regeneration computation value DECRGN is obtained by table retrieval from a #RGNNFCD table which changes with a tendency to increase accompanying an increase in vehicle speed VAST, and which differs depending on an on or off switching of various auxiliary equipment such as a compressor of an air conditioner constituting an air-conditioning system driven by the engine E.

Figure 6:
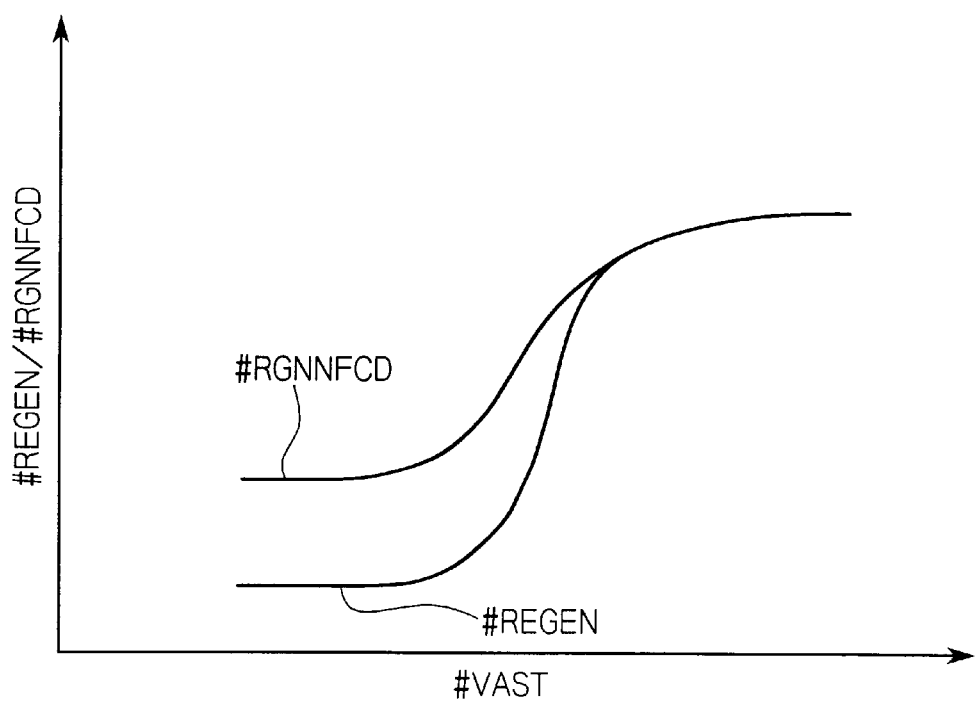
FIG. 6 is a graph showing change of a #RGNNFCD table and a #REGEN table which change in accordance with vehicle speed VAST.

For example, as shown in FIG. 6, the #RGNNFCD table is set so that particularly on the low vehicle speed side, this gives a value greater than the #REGEN table.

That is, at the time of vehicle deceleration with the brake off, when the current value THEM for the degree of throttle opening TH is smaller than a predetermined deceleration mode throttle determination value #THRGNFC for when outside fuel supply cut, the acceleration regeneration computation value DECRGN is set based on the #RGNNFCD table which gives a greater value than for the #REGEN table, particularly on the low vehicle speed side. As a result, energy recovery corresponding to operating conditions at the time of vehicle deceleration can be improved, and a deceleration feeling following the intention of the driver can be made appropriate, so that the drivability can be improved.

With this embodiment, the recovery amount is converged when below a predetermined low vehicle speed. This is because regeneration efficiency at low vehicle speed drops and hence regeneration is stopped at a specific vehicle speed. However recovery can be performed until the vehicle is stopped corresponding to the vehicle start source, and various settings are possible.

In step S107 the deceleration recovery correction amount DRGVEL which changes with a tendency to increase accompanying an increase of the mean consumption current VELAVE, is obtained by table retrieval from a #DRGVELN table.

In step S108, it is determined whether or not a battery residual amount QBAT is greater than or equal to a predetermined residual amount #QBCRSRH.

In the case where the determination is "no", the flow proceeds to the later described step S111. On the other hand, in the case where the determination is "yes", the flow proceeds to step S109. The predetermined residual amount #QBCRSRH is a value having hysteresis.

In step S109, it is determined whether or not the vehicle speed VP is greater than or equal to a predetermined speed #VRSMS.

In the case where the determination is "no", the flow proceeds to the later described step S111. On the other hand, in the case where the determination is "yes", the flow proceeds to step S110. The predetermined speed #VRSMS is a value having hysteresis.

In step S110 a value for the deceleration regeneration computation value DECRGN multiplied by a coefficient

KRSMS is made a new deceleration regeneration computation value DECRGN, and the flow proceeds to step S111.

Figure 5:
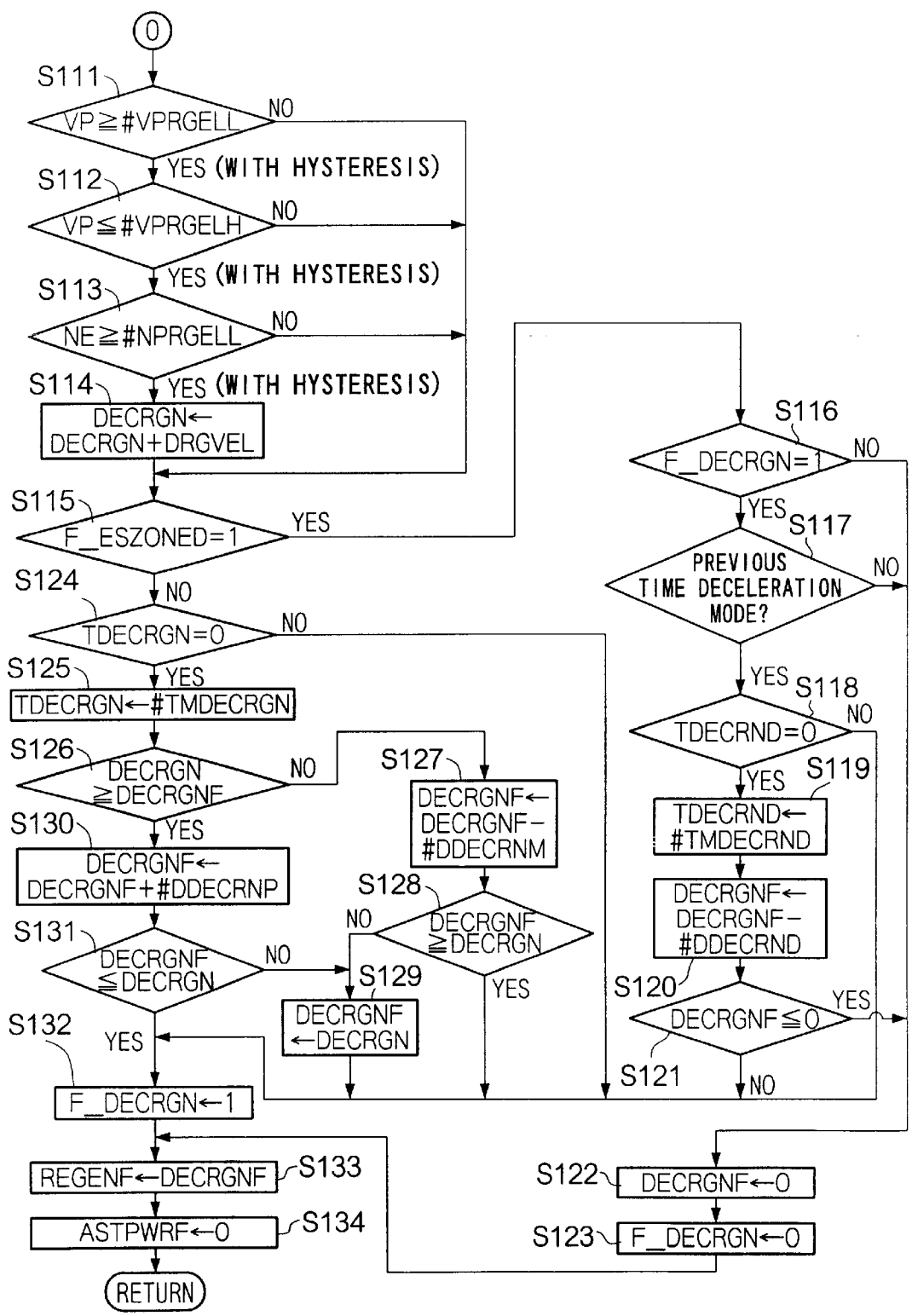
FIG. 5 is a flow chart of the deceleration mode shown in FIG. 3.

In step S111 shown in FIG. 5, it is determined whether or not the vehicle speed VP is greater than or equal to a predetermined value #VPRGELL.

In the case where the determination is "no", the flow proceeds to a later described step S115. On the other hand in the case where the determination is "yes", the flow proceeds to step S112.

In step S112, it is determined whether or not the vehicle speed VP is greater than or equal to a predetermined value #VPRGELH.

In the case where the determination is "no", the flow proceeds to the later described step S115. On the other hand in the case where the determination is "yes", the flow proceeds to step S113.

The predetermined value #VPRGELL and the predetermined value #VPRGELH are values having hysteresis.

In step S113 it is determined whether or not the engine revolution speed NE is greater than or equal to a predetermined value #NPRGELL.

In the case where the determination is "no", the flow proceeds to the later described step S115. On the other hand, in the case where the determination is "yes", the flow proceeds to step S114, and a value obtained by adding a deceleration regeneration correction amount DRGVEL to the deceleration regeneration computation value DECRGN is newly set as the deceleration regeneration computation value DECRGN, and the flow proceeds to step S115.

As a result, in the case where the consumption current of the 12V system is large, the deceleration regeneration amount is increased so that the regeneration amount supply portion to the battery 3 is maintained. The predetermined value #NPRGELL is a value having hysteresis.

In step S115, it is determined whether an energy storage zone D flag F_ESZONED is "1" or not. In the case where it is determined to be the D zone (yes), the flow proceeds to step S116, and it is determined whether or not a deceleration regeneration permission flag F_DECRGN is "1" or not. The D zone is for where the battery residual amount is from 80% to 90% up to around 100%.

In the case where the determination in step S116 is that deceleration regeneration is not permitted (no), then in step S122, a deceleration regeneration final computation value DECRGNF is set to "0", and in step S123, the deceleration regeneration permission flag F_DECRGN is set to "0".

In step S133, the final charge instruction value REGENF is set to the deceleration regeneration final computation value DECRGNF (=0), and in step S134, the final assistance command value ASTPWRF is set to "0", and the flow returns.

In the case where the determination of step S116 determines that deceleration regeneration is permitted (yes), then in step S117, it is determined whether or not a previous time was deceleration mode. In the case where it is determined that the previous time was not deceleration mode (no), the flow proceeds to step S122. In the case where in step S117 it is determined that the previous time was deceleration mode (yes), the flow proceeds to step S118, and it is determined whether a gradually decreased update timer TDECRND is "0" or not.

In step S118, in the case where it is determined that the gradually decreased update timer TDECRND is not "0" (no), then in step S132, the deceleration regeneration permission flag F_DECRGN is set to "1", and the flow proceeds to step S133.

In step S118, in the case where it is determined that the gradually decreased update timer TDECRND is "0" (yes), then in step S119, the gradually decreased update timer TDECRND is set to a predetermined value #TMDECRND, and the flow proceeds to step S120. In step S120, a value obtained by subtracting a gradually decreased term #DDECRND from the deceleration regeneration final computation value DECRGNF is set as a new deceleration regeneration final computation value DECRGNF. In step S121, in the case where it is determined that the deceleration regeneration final computation value DECRGNF is less than or equal to "0" (yes), the flow proceeds to step S122. In step S121, in the case where the deceleration regeneration final computation value DECRGNF is greater than "0" (no) the flow proceeds to step S132.

In step S115, it is determined whether the energy storage zone D flag F_ESZONED is "1" or not, and in the case where it is determined not to be the D zone (no), the flow proceeds to step S124.

In step S124 it is determined whether a gradually decreased update timer TDECRGN is "0" or not. In the case where the determination in step S124 is that the gradually decreased update timer TDECRGN is "0" (yes), the flow proceeds to step S125. In the case where the determination of step S124 is that the gradually decreased update timer TDECRGN is not "0" (no), the flow proceeds to step S132.

In step S125, the gradually decreased update timer TDECRGN is set to a predetermined value #TMDECRGN. In step S126 it is determined whether or not the deceleration regeneration computation value DECRGN is greater than or equal to the deceleration regeneration final computation value DECRGNF. In the case where the determination in step S126 is (yes), then in step S130 a gradually increased value #DDECRNP is added to the deceleration regeneration final computation value DECRGNF, and in step S131 it is determined whether or not the deceleration regeneration computation value DECRGN is greater than or equal to the deceleration regeneration final computation value DECRGNF. In the case where the determination in step S131 is that the deceleration regeneration computation value DECRGN is greater than or equal to the deceleration regeneration final computation value DECRGNF (yes) the flow proceeds to step S132.

In the case where the determination in step S131 is that the deceleration regeneration computation value DECRGN is less than the deceleration regeneration final computation value DECRGNF (no), the flow proceeds to step S129. Here the deceleration regeneration final computation value DECRGNF is set to the deceleration regeneration computation value DECRGN, and the flow proceeds to step S132.

In the case where the determination in step S126 is "no", then in step S127 a gradually decreased value #DDECRNM is subtracted from the deceleration regeneration final computation value DECRGNF, and in step S128 it is determined whether or not the deceleration regeneration final computation value DECRGNF is greater than or equal to the deceleration regeneration computation value DECRGN. In the case where the determination in step S128 is that the deceleration regeneration computation value DECRGN is greater than the deceleration regeneration final computation value DECRGNF (no), the flow proceeds to step S129. In the case where the determination in step S128 is that the deceleration regeneration final computation value DECRGNF is greater than or equal to the deceleration regeneration computation value DECRGN (yes) the flow proceeds to step S132.

Fuel Supply Cut Discrimination Processing

Fuel supply cut discrimination processing will now be described, based on the flow chart of FIG. 7 and FIG. 8.

Figure 7:
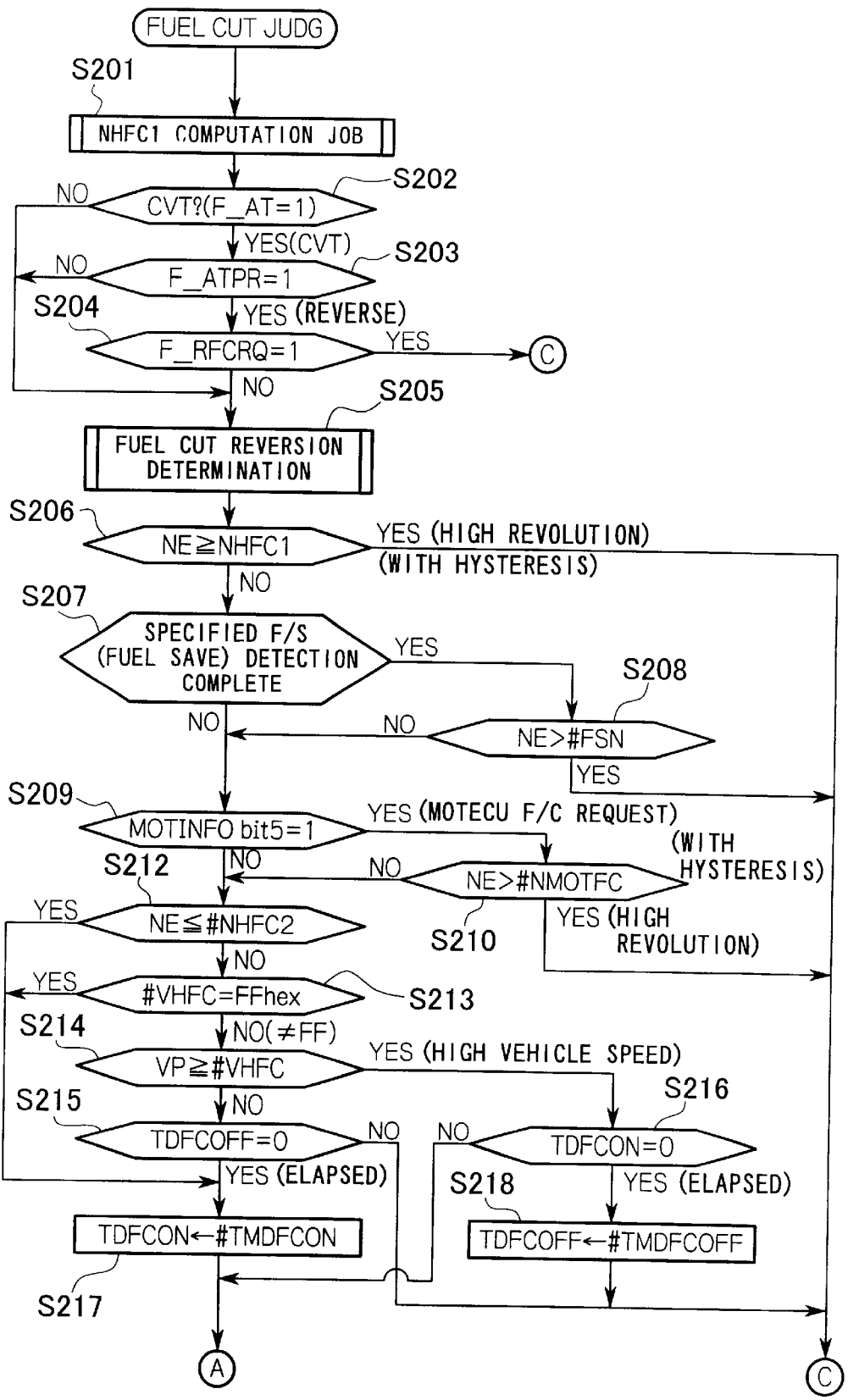
FIG. 7 is a flow chart showing fuel supply cut discrimination processing.
Figure 8:
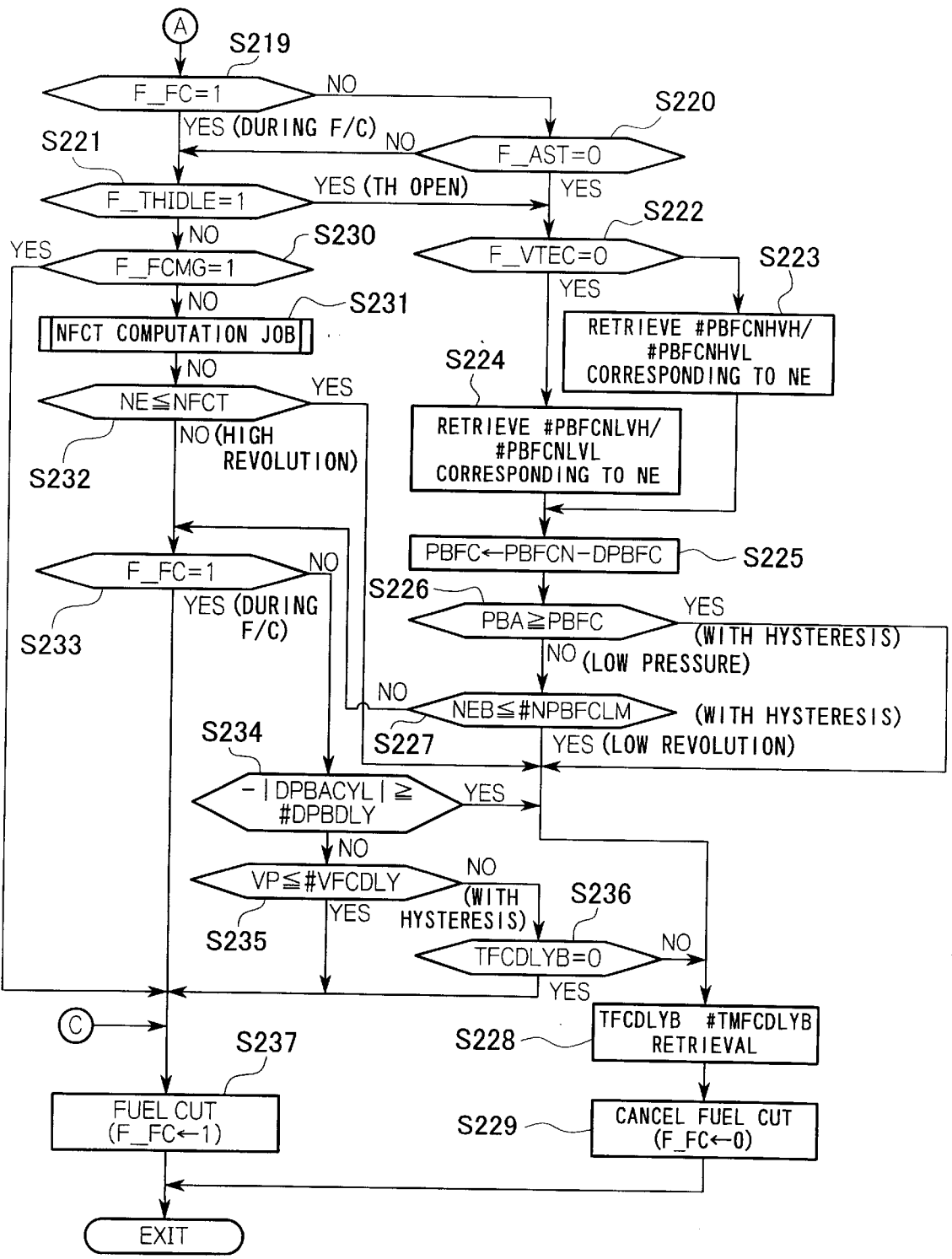
FIG. 8 is a flow chart showing the fuel supply cut discrimination processing.

At first, in step S201 of FIG. 7, a fast rotation fuel supply cut revolution speed NHFC1 which is referred to at the time of executing fuel supply cut corresponding to engine conservation at the time of fast rotation is computed.

Next, in step S202, it is determined whether the MT/CVT determination flag F_AT is "1" or not.

In the case where the determination is "no", that is in the case where it is determined to be an MT vehicle, the flow proceeds to a later described step S205. On the other hand, in the case where the determination is yes, that is the case where it is determined to be a CVT vehicle, the flow proceeds to step S203.

In step S203 it is determined whether the reverse position determination flag F_ATPR is "1" or not.

In the case where the determination is "no", that is in the case of a position other than reverse, the flow proceeds to the later described step S205. On the other hand, in the case where the determination is "yes", that is in the case of the reverse position, the flow proceeds to step S204.

In step S204 it is determined whether a flag value of a reverse time fuel supply cut flag F_RFCRQ requested from the CVTECU 21 is "1" or not.

In the case where the determination is "no", the flow proceeds to step S205. On the other hand, in the case where the determination is yes, the flow proceeds to step S237, the fuel supply cut flag F_FC is set to "1", and one series of the processing is terminated.

In step S205, processing for determining reversion from fuel supply cut is performed. Here, for example stopping of fuel supply cut is determined based for example on accelerator opening TH, engine revolution speed NE, vehicle speed VP, or the like.

In step S206 it is determined whether the engine revolution speed NE is greater than or equal to the fast rotation fuel supply cut revolution speed NHFC1. The fast rotation fuel supply cut revolution speed NHFC1 is a value having hysteresis.

In the case where the determination is "yes", that is it is determined to be fast rotation, the flow proceeds to step S237, the fuel supply cut flag F_FC is set to "1", and one series of the processing is terminated.

On the other hand, in the case where the determination is "no", that is in the case where it is determined to be slow rotation, the flow proceeds to step S207.

In step S207, it is determined whether specified F/S (fuel save) detection has been completed or not.

In the case where the determination is "yes", that is in the case where specified F/S detection has been completed and there are some abnormalities, the flow proceeds to step S208.

On the other hand in the case where the determination is "no", that is the specified F/S detection has not been completed and there are also no abnormalities, the flow proceeds to a later described step S209.

In step S208, it is determined whether or not the engine revolution speed NE is greater than a predetermined specified F/S detection time revolution speed #FSN. The specified F/S detection time revolution speed #FSN is a value having hysteresis.

In the case where the determination is "no", the flow proceeds to step S209. On the other hand, in the case where the determination is "yes", the flow proceeds to step S237, the fuel supply cut flag F_FC is set to "1", and one series of the processing is terminated.

In step S209 it is determined whether a bit information MOTINFO-bit 5 sent from the motor ECU 1 to the FIECU 11 is set to "1" or not.

In the case where the determination is "yes", that is in the case where execution of fuel supply cut in the motor ECU 1 is required, the flow proceeds to step S210. On the other hand, in the case where the determination is "no", that is, in the case where execution of fuel supply cut in the motor ECU 1 is not required, the flow proceeds to a later described step S212.

In step S210, it is determined whether or not the engine revolution speed NE is greater than a predetermined fuel supply cut request time revolution speed #NMOTFC. The predetermined fuel supply cut request time revolution speed #NMOTFC is a value having hysteresis.

In the case where the determination is "no" the flow proceeds to step S212. On the other hand, in the case where the determination is "yes", the flow proceeds to step S237, the fuel supply cut flag F_FC is set to "1", and one series of the processing is terminated.

In step S212 it is determined whether or not the engine revolution speed NE is less than or equal to a predetermined high vehicle speed limiter discrimination revolution speed #NHFC2. In the case where the determination is "yes", that is in the case where it is determined that there is slow rotation, the flow proceeds to a later described step S217. On the other hand in the case where the determination is "no", that in the case where it is determined that there is fast rotation, the flow proceeds to step S213.

In step S213, it is determined whether or not a predetermined high vehicle speed limiter discrimination vehicle speed #VHFC is set to "FF" (hexadecimal).

In the case where the determination is "yes", that is in the case where it is determined that there is no limiter, the flow proceeds to the later described step S217. On the other hand, in the case where the determination is "no", that is in the case where it is determined that there is a limiter, the flow proceeds to step S214.

In step S214, it is determined whether a control vehicle speed VP is greater than or equal to the predetermined high vehicle speed limiter discrimination vehicle speed #VHFC.

In the case where the determination is "no", that is in the case where it is determined that the vehicle speed is low, the flow proceeds to step S215. On the other hand, in the case where the determination is "yes", that is in the case where it is determined that the vehicle speed is high, the flow proceeds to a later described step S216.

In step S215, it is determined whether a high vehicle speed fuel supply cut reversion delay timer TDFCOFF is set to "0" or not.

In the case where the determination is "no", the flow proceeds to step S237, the fuel supply cut flag F_FC is set to "1", and one series of the processing is terminated.

On the other hand, in the case where the determination is "yes", the flow proceeds to step S217, a high vehicle speed fuel supply cut delay timer TDFCON is set to a predetermined value #TMDFCON (for example 0.3 sec), and the flow proceeds to a later described step S219. In step S216, it is determined whether the high vehicle speed fuel supply cut delay timer TDFCON is set to "0" or not.

In the case where the determination is "no", the flow proceeds to the later described step S219. On the other hand, in the case where the determination is "yes", the flow proceeds to step S218, the high vehicle speed fuel supply cut reversion delay timer TDFCOFF is set to a predetermined value #TMDFCOFF (for example 0.2 sec), and the flow proceeds to step S237, the fuel supply cut flag F_FC is set to "1", and one series of the processing is terminated.

In step S219, it is determined whether the fuel supply cut flag F_FC is set to "1" or not.

In the case where the determination is "no", the flow proceeds to step S220. On the other hand, in the case where the determination is "yes", the flow proceeds to a later described step S221.

In step S220, it is determined whether a post starting discrimination flag F_AST is set to "0" or not.

In the case where the determination is "no", that is, in the case where it is determined to be after starting, the flow proceeds to step S221. On the other hand, in the case where the determination is "yes", that is in the case where it is determined to be not after starting, the flow proceeds to a later described step S222.

In step S221, it is determined whether an idle determination flag F_THIDLE is set to "1" or not.

In the case where the determination is "yes", that is in the case where it is determined that the degree of throttle opening TH is open, the flow proceeds to step S222.

On the other hand, in the case where the determination is "no", that is in the case where it is determined that the degree of throttle opening TH is fully closed, the flow proceeds to a later described step S230.

In step S222, it is determined whether a variable valve timing flag F_VTEC is set to "0" or not.

In the case where the determination is "no", that is in the case of high load side valve timing, the flow proceeds to step S223, and a fuel supply cut determination air intake passage pressure retrieval value PBFCN is looked up from a high load side fuel supply cut determination air intake passage pressure table #PBFCNHVH/L corresponding to the engine revolution speed NE.

On the other hand, in the case where the determination is "yes", that is in the case of low load side valve timing, the flow proceeds to step S224, and the fuel supply cut determination air intake passage pressure retrieval value PBFCN is looked up from a low load side fuel supply cut determination air intake passage pressure table #PBFCNLVH/L corresponding to the engine revolution speed NE.

In step S225, a value obtained by subtracting a fuel supply cut determination air intake passage pressure difference value DPBFC from the fuel supply cut determination air intake passage pressure retrieval value PBFCN is set as a fuel supply cut determination air intake pressure PBFC.

In step S226, it is determined whether an absolute air intake passage pressure PBA is greater than or equal to the fuel supply cut determination air intake pressure PBFC. The fuel supply cut determination air intake pressure PBFC is a value having hysteresis In the case where the determination is "yes", that is in the case on the high negative pressure side, the flow proceeds to a later described step S228. On the other hand, in the case where the determination is "no", that is in the case on the low negative pressure side, the flow proceeds to step S227. In step S227, it is determined whether an engine revolution speed NEB is less than or equal to a predetermined fuel supply cut execution lower limit revolution speed #NPBFCLM. The fuel supply cut execution lower limit revolution speed #NPBFCLM is a value having hysteresis.

In the case where the determination is "no", that is in the case where it is determined that there is fast rotation, the flow proceeds to a later described step S233. On the other hand, in the case where the determination is "yes", that is in the case where it is determined that there is slow rotation, the flow proceeds to step S228.

In step S228, a fuel supply cut execution delay timer value TFCDLYB is looked up from a fuel supply cut execution delay timer table #TMFCDLYB which is set so as to reduce accompanying an increase in the engine revolution speed NEB.

In step S229, the fuel supply cut flag F_FC is set to "0", execution of the fuel supply cut is cancelled, and one series of the processing is terminated.

Furthermore, in step S230, it is determined whether an engine stop control execution flag F_FCMG which is set corresponding to the energy management, is set to "1" or not.

In the case where the determination is "no", the flow proceeds to step S231. On the other hand, in the case where the determination is "yes", the flow proceeds to a later described step S237.

In step S231, computation processing for a fuel supply cut lower limit revolution speed NFCT is performed.

In step S232, it is determined whether or not the engine revolution speed NE is less than or equal to the fuel supply cut lower limit revolution speed NFCT.

In the case where the determination is "yes", that is in the case where it is determined that there is slow rotation, the flow proceeds to step S228. On the other hand, in the case where the determination is "no", that is in the case where it is determined that there is fast rotation, the flow proceeds to step S233.

In step S233, it is determined whether the fuel supply cut flag F_FC is set to "1" or not.

In the case where the determination is "no", the flow proceeds to step S234. On the other hand, in the case where the determination is "yes", the flow proceeds to step S237.

In step S234, it is determined whether a negative value of an absolute value (−|DPBACYL|) of an absolute air intake passage pressure difference DPBACYL is greater than or equal to a predetermined absolute air intake passage pressure difference #DPBACYL. The absolute air intake passage pressure difference DPBACYL is the difference between the absolute air intake passage pressure PBA one cycle before (for example with three cylinders, 3 TDC) and the present absolute air intake passage pressure PBA.

In the case where the determination is "yes", that is in the case where it is determined that the change of the absolute air intake passage pressure PBA is large, the flow proceeds to step S228. On the other hand, in the case where the determination is "no", that is in the case where it is determined that the change of the absolute air intake passage pressure PBA is small, the flow proceeds to step S235.

In step S235, it is determined whether or not the vehicle speed VP is less than or equal to a substitute vehicle speed #VFCDLY having a predetermined delay timer.

In the case where the determination is "no", that is in the case where it is determined to be high speed, the flow proceeds to step S236. On the other hand, in the case where the determination is "yes", the flow proceeds to step S237, the fuel supply cut flag F_PC is set to "1", and one series of the processing is terminated.

In step S236, it is determined whether the fuel supply cut execution delay timer value TFCDLYB is "0" or not.

In the case where the determination is "yes", the flow proceeds to step S237, the fuel supply cut flag F_FC is set to "1", and one series of the processing is terminated. On the other hand, in the case where the determination is "no", the flow proceeds to step S229.

That is, in the case where; the engine revolution speed NE is greater than the fuel supply cut lower limit revolution speed NFCT, the change of the absolute air intake passage pressure PBA is small, the vehicle speed VP is greater than the substitute vehicle speed #VFCDLY having the predetermined delay timer, and the fuel supply cut execution delay timer value TFCDLYB is being measured, fuel supply to the engine E is executed. In this condition, at the point in time when measurement of the fuel supply cut execution delay timer value TFCDLYB is completed, the fuel supply to the engine E is stopped.

According to the control apparatus for a hybrid vehicle of this embodiment, at the time of low vehicle speed, during measurement of the fuel supply cut execution delay timer value TFCDLYB when moving from the condition of executing fuel supply to the engine E to the condition of executing fuel supply cut, regenerative braking by the motor is performed so that the electric power generation amount set corresponding to the vehicle operating condition is satisfied, and a part of the kinetic energy of the vehicle is converted to electrical energy and stored in the battery 3. Hence energy recovery can be improved.

Furthermore, by setting the deceleration regeneration computation value DECRGN which differs depending on the determination of whether or not the current value THEM for the degree of throttle opening TH is less than the predetermined deceleration mode throttle determination value #THRGNFC for at a time other than with fuel supply cut, and depending on an on or off condition of a switch, the deceleration feeling can be made to appropriately follow the intention of the driver, so that drivability can be improved.

Furthermore, at the time of vehicle deceleration with the brake in the off condition, for example as shown in FIG. 6, by setting the #RGNNFCD table so that on the low vehicle speed side, this gives a value greater than that of the #REGEN table, energy recovery can be even further improved. Moreover, since the effect of the regenerative braking on the deceleration feeling which the driver feels has a greater influence more on the low speed side, the deceleration feeling can be made to even more appropriately follow the intention of the driver, so that drivability can be improved.

In the above described present embodiment, as shown in FIG. 6, the #RGNNFCD table and the #REGEN table are set so as to become the same value on the high speed side. However, the setting is not limited to this, and for example the #RGNNFCD table may be set so as to become a value greater than the #RGEN table.

What is claimed is:

1. A control apparatus for a hybrid vehicle incorporating an engine and a motor as the vehicle drive sources, and a storage unit which converts a part of an output of said engine or kinetic energy of said vehicle into electrical energy by said motor, and stores this, said control apparatus comprising:

an operating condition detection device which detects an operating condition of said vehicle;

a deceleration condition detection device which detects a deceleration condition at a time of deceleration of said vehicle;

a fuel supply amount control device which at a time of deceleration of said vehicle detected by said deceleration condition detection device, executes stopping and supply of fuel to said engine corresponding to operating condition of said vehicle;

an electric power generation amount control device which at a time of deceleration of said vehicle detected by said deceleration condition detection device, in the case where regenerative braking is performed to convert a part of the kinetic energy of said vehicle into electrical energy by said motor, sets the electric power generation amount which should be recovered by said motor to generate electric power, based on the operating conditions of said vehicle detected by said operating conditions detection device; and a motor control device which performs regenerative braking in accordance with said electric power generation amount set by said electric power generation amount setting device;

wherein said electric power generation amount control device has an electric power generation amount setting device which sets in said fuel supply amount control device, a first electric power generation amount for a vehicle operating condition in a deceleration condition of said vehicle at a time of moving from a condition of executing fuel supplying to said engine to the condition of stopping fuel supply, and sets in said fuel supply amount control device, a second electric power generation amount for a vehicle operating condition in a deceleration condition of said vehicle at a time of executing stopping of fuel supply to said engine.

2. A control apparatus for a hybrid vehicle according to claim 1, wherein said electric power generation amount setting device sets said first electric power generation amount to a larger value than said second electric power generation amount.

3. A control apparatus for a hybrid vehicle according to claim 2, wherein said electric power generation amount setting device sets a difference between said first electric power generation amount and said second electric power generation amount so as to increase with a reduction in speed of said vehicle within a predetermined range of said speed.

4. A control apparatus for a hybrid vehicle according to claim 1, wherein said electric power generation amount setting device corrects said first electric power generation amount and said second electric power generation amount in accordance with an operation of a control device which controls said vehicle and an operation of various auxiliary equipment and the like which are driven by said engine.

5. A control apparatus for a hybrid vehicle according to claim 4, wherein said electric power generation amount setting device, in a deceleration condition of said vehicle while moving from a condition of executing fuel supplying to said engine to condition of stopping fuel supply, in a case where said control device is not operated and an accelerator is not depressed, sets so that the regeneration electric power generation amount by said motor becomes said first electric power generation amount.

6. A control apparatus for a hybrid vehicle according to claim 5, wherein said electric power generation amount setting device, in a deceleration condition of said vehicle while moving from a condition of executing fuel supplying to said engine to condition of stopping fuel supply, in a case where said control device is operated and the accelerator is not depressed, sets so that the regeneration electric power generation amount by said motor becomes said second electric power generation amount.

* * * * *